United States Patent
Gerace et al.

(10) Patent No.: US 7,032,168 B1
(45) Date of Patent: Apr. 18, 2006

(54) METHOD AND APPARATUS FOR GENERATING WEBSITE LINKS

(75) Inventors: Thomas A. Gerace, Roxbury, MA (US); Sam Gerace, Westborough, MA (US); Stephen Evans, Somerville, MA (US); Scott Jangro, Bolton, MA (US); Craig Palli, Newton, MA (US); Raj Melville, Northboro, MA (US); Ellen Brezniak, Westborough, MA (US); Padmanabhan Krishnamoorthy, Pittsburgh, PA (US); John L. Mihalik, Pittsburgh, PA (US)

(73) Assignee: Be Free, Inc., Westlake Village, CA (US)

( * ) Notice: Subject to any disclaimer, the term of this patent is extended or adjusted under 35 U.S.C. 154(b) by 622 days.

(21) Appl. No.: 09/994,368

(22) Filed: Nov. 27, 2001

Related U.S. Application Data

(60) Provisional application No. 60/253,570, filed on Nov. 28, 2000.

(51) Int. Cl.
*G06F 17/21* (2006.01)
(52) U.S. Cl. ....................... 715/501.1; 705/14
(58) Field of Classification Search ............. 715/501.1; 705/14, 64
See application file for complete search history.

(56) References Cited

U.S. PATENT DOCUMENTS

| | | | |
|---|---|---|---|
| 5,712,979 A | | 1/1998 | Graber et al. |
| 5,717,860 A | | 2/1998 | Graber et al. |
| 5,948,061 A | | 9/1999 | Merriman et al. |
| 5,991,740 A | * | 11/1999 | Messer ................. 705/27 |
| 6,029,141 A | | 2/2000 | Bezos et al. |
| 6,760,711 B1 | * | 7/2004 | Gillett et al. ............ 705/64 |
| 6,826,559 B1 | * | 11/2004 | Ponte ....................... 707/3 |
| 2001/0020231 A1 | * | 9/2001 | Perri et al. .............. 705/14 |
| 2002/0004796 A1 | * | 1/2002 | Vange et al. ............ 707/10 |
| 2004/0111319 A1 | * | 6/2004 | Matsumoto et al. ...... 705/14 |
| 2004/0148366 A1 | * | 7/2004 | Ross et al. .............. 709/218 |

OTHER PUBLICATIONS

Amazon.com, as published on Oct. 13, 1999 and archived at http://web.archive.org/web/19991013091817/http://amazon.com/.*

Mitchell, Designing Active Server Pages—Chapter 7, "Lesser-Known Microsoft COM Components" (O'Reilly Publishers, Sep. 2000).*

"Be Free Announces ClickStart[SM] Fast & Easy Affiliate Link Generation Tool Integrates Affiliate Application & Link Generation within Web Authoring Tools," Press release Jan. 26, 2000 (3 pp. ).

* cited by examiner

*Primary Examiner*—Doug Hutton
(74) *Attorney, Agent, or Firm*—Niro, Scavone, Haller & Niro

(57) ABSTRACT

An application program interface (API), enables web development tools to interact directly with a hyperlink database subsystem. Tool developers use this API to design functionality that enables affiliates to log on to the hyperlink database system and generate merchant links. In response to requests from vendors' tools, the invention API uses the XML format to deliver requested hyperlink generation information. The requests are encrypted for users' privacy. The returned hyperlink generation information includes lists of merchants, lists of hyperlinks to the merchants web sites, the HTML code supporting the hyperlinks, and graphics for the links. Users implement hyperlinks by selecting among the choices returned in the response to the request and graphically placing (i.e., by drag and drop interaction) the resulting hyperlinks on subject web pages in a simple, error-free manner.

49 Claims, 3 Drawing Sheets

METHOD AND APPARATUS FOR GENERATING WEBSITE LINKS

RELATED APPLICATION

This application claims the benefit of U.S. Provisional Application No. 60/253,570 filed on Nov. 28, 2000.

The entire teachings of the above application are incorporated herein by reference.

BACKGROUND OF THE INVENTION

Contents of a web page may include text and images. So called "hyperlinks" may be embedded in any of the text or image areas of a web page. A hyperlink embedded in a given web page allows someone accessing the given page to access another web page which is the destination of the link. In this way, hyperlinks allow a web user to navigate through a variety of web pages across different web sites or within a common web site and access numerous pieces of information.

A hyperlink has two major parts, namely, a representation and the underlying code. The representation is visible to the end user and is usually in the form of a character string, graphical image, or other visual element of a web page indicating the presence of a hyperlink. When an end user viewing a given web page moves the cursor over a hyperlink, the cursor changes its shape, the hyperlink's visible representation is altered, or some other clue is given to the end user that a cursor click on that part of the web page would activate the hyperlink.

The underlying code of a hyperlink is not visible to the end user. The underlying code is usually in the Hypertext Markup Language (HTML) format and contains the Universal Resource Locator (URL) of the link destination and some additional information. When the end user activates a hyperlink (e.g., as described above), the underlying code is executed by the end user's computer. This causes the computer to access and present to the end user the web page designated by the destination URL and possibly to transmit some additional information on the network.

Hyperlinks may be embedded in a web page for promotional or commercial purposes. For example, to increase web users' awareness of a merchant's web site and offers presented therein, other web sites may serve as referrals to the merchant's web site. The owners of such referring web sites are termed affiliates, associates, or business partners and the like of the referred merchant. Typically, a referring web site has one or more web pages that recite the referred merchant by company name, web site, description of products or services, etc. and ultimately make reference to the pertinent web page of the referred merchant. A hyperlink is coupled to the reference, and upon the end user's selection of the reference on the referring web page, a referred merchant's web page is presented to the end user. Consequently, the end user begins interacting with the referred merchant's web site.

Support for such linking from a referring web site to the referred merchant's web site requires the appropriate code (e.g., the underlying code of a hyperlink to the referred merchant's web site) to be embedded in a web page of the referring web site.

From the foregoing discussion, one can see the importance of error-free generation of the HTML code including the URL underlying commercial and promotional hyperlinks. Thus, there is a need for a web development tool that enables the proper embedding of hyperlinks and reduces errors in the process.

SUMMARY OF THE INVENTION

The present invention is a method and a system for developing and embedding hyperlinks in web pages. The preferred embodiment is a web development tool employing an application programmer's interface (API). The invention allows web development tools to seamlessly and invisibly connect to a computer system storing promotional hyperlinks to merchants' web pages. A user of a web development tool employing the invention can select a merchant from a list of merchants, select a group of hyperlinks available to the user from the selected merchant, select a hyperlink within the selected group, and place the selected hyperlink on a web page within seconds without having to write or copy any code.

In one embodiment, the invention uses the Hypertext Transfer Protocol (HTTP) to request and receive information stored within the invention system and the eXtensible Markup Language (XML) format to receive information from the system. Further, the invention uses the Encrypt-Server, a reusable component DLL on the Windows platform, to encrypt and decrypt the messages it sends and receives. The encryption key is identifiable by a key ID sent unencrypted together with requests.

In the preferred embodiment, a computer system and method generates a hyperlink on a web page by a client computer (i) sending a request having an input set of hyperlink parameters, and (ii) receiving a response comprising at least one of:

an output set of hyperlink parameters, and data necessary for generating at least one hyperlink.

Similarly, a computer method and system of the present invention delivers a hyperlink on hyperlink generation information by a server computer (i) receiving a request having an input set of hyperlink parameters, and (ii) sending a response comprising at least one of:

an output set of hyperlink parameters; and data necessary for generating at least one hyperlink.

The input set of hyperlink parameters may be selected from a plurality of input sets of hyperlink parameters. The input set of hyperlink parameters includes a user name and password (e.g., of the affiliate end user).

The input set of hyperlink parameters and/or the output set of hyperlink parameters includes any combination of at least one of a Merchant identifier, Affiliate Site identifier, Section Link Group identifier, Link identifier, Image identifier, and Program identifier.

The data necessary for generating the at least one hyperlink comprises code data necessary to execute each said hyperlink. The code data conforms to the Hypertext Markup Language (HTML) standard. The code data may also include a uniform resource locator (URL).

The data necessary for generating the at least one hyperlink comprises visual representation data describing at least one form of visual appearance of said at least one hyperlink on the web page. The visual representation data includes a uniform resource locator (URL) for an image. Further the visual representation data includes indications of dimensions of an image.

Further, the input set of hyperlink parameters may be combined with the output set of hyperlink parameters to form a second input set of hyperlink parameters.

The invention by its ease and simplicity of operation benefits both users of the web development tools employing the invention system and the merchants whose web pages and sites are being promoted by the hyperlinks placed on web pages using the invention API.

BRIEF DESCRIPTION OF THE DRAWING

The foregoing and other objects, features and advantages of the invention will be apparent from the following more particular description of preferred embodiments of the invention, as illustrated in the accompanying drawing. The drawings are not necessarily to scale, emphasis instead being placed upon illustrating the principles of the invention.

DETAILED DESCRIPTION OF THE INVENTION

Figure 1:
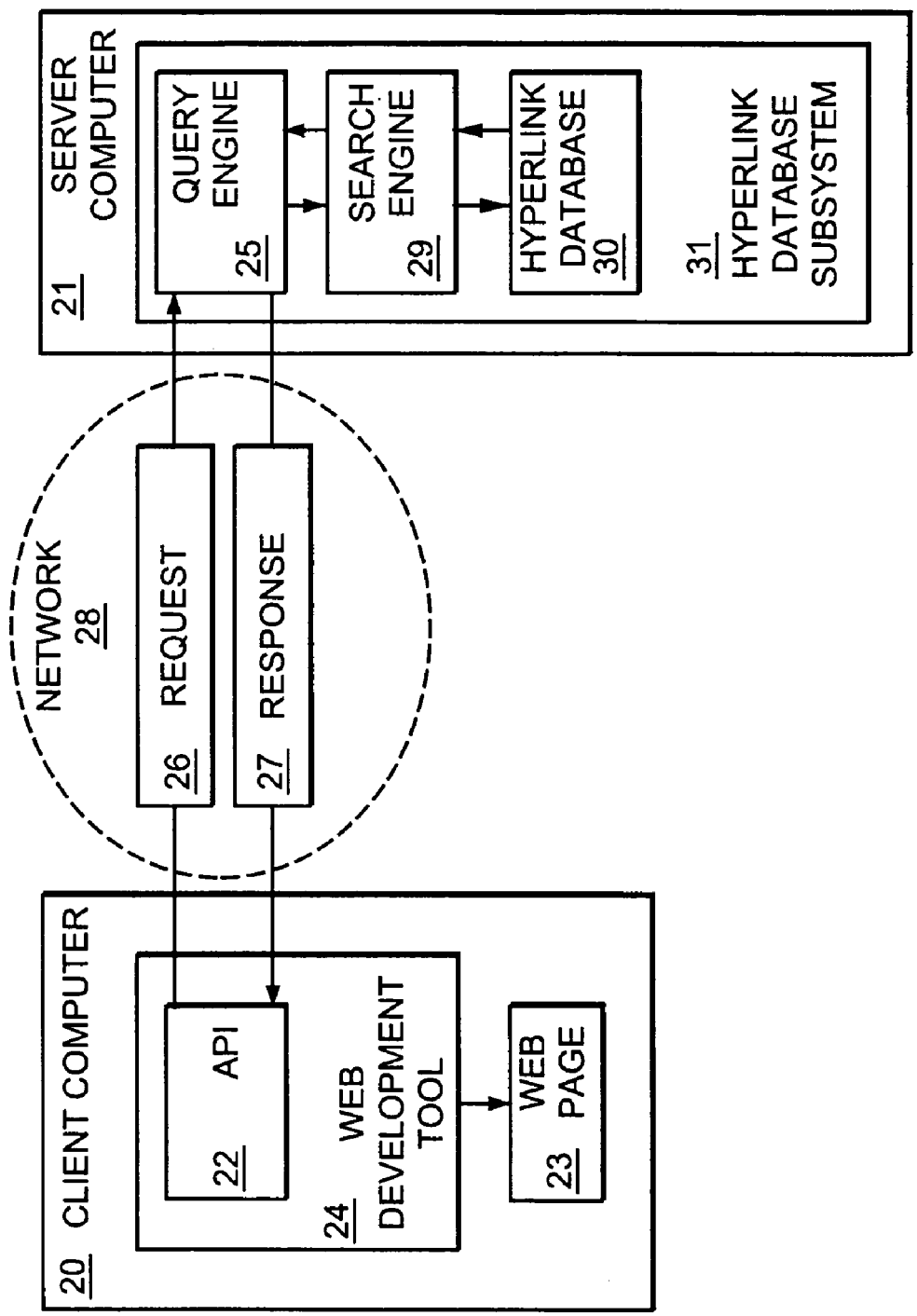
FIG. 1 is an overview of the invention system and the communications between a client computer and a server computer during deployment of one embodiment.

A description of preferred embodiments of the invention follows.

The word "hyperlink" or "link" used below without additional qualifications refers to both the underlying code and visual representation of a hyperlink created in the process and as a result of practicing the present invention.

The terms "affiliate," "end user," "merchant," "section link group," "vendor," and "web development tool" will be used throughout this specification. An "affiliate" is someone who creates hyperlinks for subsequent inclusion in a web page or web pages. Typically, such web pages are owned by the affiliate. The nature of these hyperlinks and how they are created will be explained below. An "end user" is someone viewing a web page that includes a link or links created by an affiliate. A "merchant" is someone who offers to an affiliate to create a specific hyperlink or hyperlinks to a page or pages on the merchant's web site (i.e., this merchant's hyperlinks). A merchant's hyperlinks are usually grouped into several "section link groups." A merchant usually deals with several affiliates (i.e., this merchant's affiliates). An affiliate may deal with several merchants (i.e., this affiliate's merchants). A "vendor" is someone who develops and supplies a computer application program, called a "web development tool," for use by an affiliate to design web pages. The present invention, when employed by a web development tool, simplifies and makes more reliable the creation of hyperlinks during the design of web pages.

Typically, a hyperlink is intended to bring the end user from a web page on the affiliate's web site to a web page owned by the merchant (normally located on the merchant's web site). In the process of bringing the end user to the hyperlink's destination, some additional information may be transmitted from the end user's computer to a merchant or a third party. This transmission of information is controlled by the code implementing the hyperlink on a web page. The information thus transmitted may be used for accounting purposes, for collecting statistics about the end users' actions on the network, or to facilitate a commercial transaction between the end user and a merchant (e.g., a purchase). Clearly, it is important that the proper code is used in the hyperlink. Human errors (e.g., a mistake in a single character in the code) are highly probable without automated web development tools.

The present invention allows a vendor's program to automate creation of hyperlinks by accessing a hyperlink database. In the preferred embodiment illustrated in FIG. 1, the hyperlink database 30 stores various preformatted (generally error free) hyperlink code in HTML format and image representations for hyperlinks to respective merchants' web pages. The hyperlink database 30 is combined with a query engine 25 and a search engine 29 to form a database subsystem 31. The query engine 25 enables requests 26 for data from the database 30 to be made. The query engine 25 forms queries from received requests 26. These queries are in a format and configuration acceptable by the search engine 29. The query engine 25 passes the generated queries to search engine 29.

In turn, the search engine 29 responds to the queries received from query engine 25. The search engine 29 processes the received queries (which represent a request 26) and searches the hyperlink database 30 for data that satisfies the queries and hence satisfies the request 26. The search engine 29 extracts or otherwise retrieves data (i.e., preformatted, prepared code for desired hyperlinks, graphical images for visually representing hyperlinks on web pages, etc.) from the database 30 and provides the retrieved data to the query engine 25 as a response to the initial queries from query engine 25. Query engine 25 formats the responses received from the search engine 29 and therefrom provides responses 27 to respective requests 26.

An example of a hyperlink database subsystem is the BFAST system operated by Be Free, Inc. of Marlborough, Mass., (BFAST is a trademark of Be Free, Inc.) Other database subsystems are suitable.

The hyperlink database subsystem 31 is a part of a computer system 21 capable of receiving data requests 26 and transmitting the resulting data (desired hyperlink code and the like) 27 over a network 28. In particular, computer system 21 is coupled for communication across network 28 to a the vendor's web development tool 24 running on a client computer 20. During the design of a web page 23, the web development tool 24 invokes an application program interface (API) 22 to generate the data requests 26 and to receive the resulting responses 27 (e.g., hyperlink code extracted from database 30). Thus, the API 22 enables web development tools 24 to interact directly with the hyperlink database subsystem 31 (e.g., BFAST) to create hyperlinks on web pages 23 under design/construction.

In the preferred embodiment, the invention API 22 benefits affiliates and vendors by allowing seamless integration of link creation into web development tools 24. For example Netopia (of Alameda, Calif.), a vendor, can use the invention API 22 with its netJane program to connect to the BFAST database subsystem 31 on behalf of an affiliate. This allows affiliates to get their merchants' hyperlinks (i.e., underlying code especially) and insert these hyperlinks directly into the web pages 23 they are developing using netJane's integrated interface.

The invention API 22 also benefits merchants by offering an easier and more accurate alternative for their affiliates to create the desired links on subject web pages 23.

Vendors can use the invention API 22 as part of their web development tools 24 to provide affiliates with the ability to do the following:
   enter a user name and password to be recognized by the hyperlink database 30;
   view a list of their merchants;

choose a specific merchant to see a list of section link groups available from this merchant;

choose a specific section link group to see a list of hyperlinks available within this section link group; and choose a specific hyperlink and include it in a subject web page 23.

Figure 3:
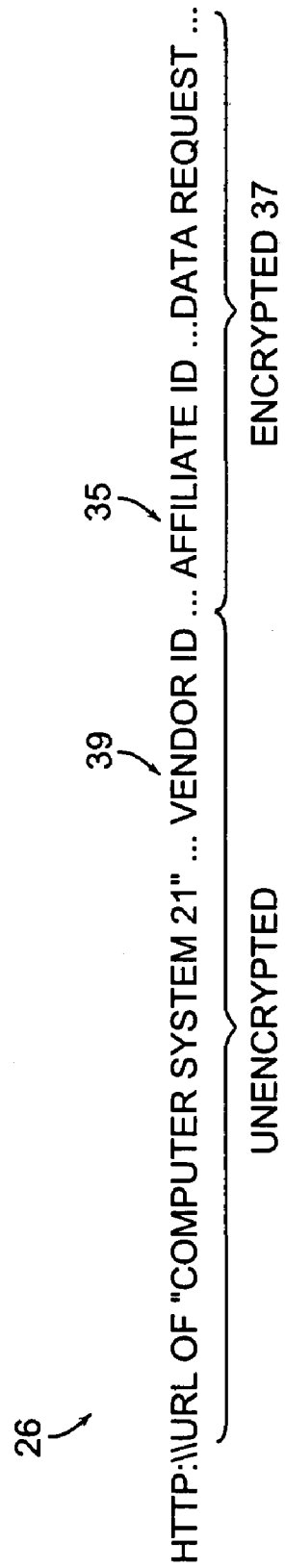
FIG. 3 is a schematic view of the security configured request messages employed in the embodiment of FIG. 1.

For security measures, in one embodiment, a user name and a password of the affiliate are required to use the hyperlink database 30. In that case the invention API 22 uses a data encryption scheme to include affiliate user name and password in the requests 26 and to protect the affiliate's (or web development tool's 24) communications. In particular, the portion 37 of requests 26 containing the affiliate user name and password (collectively affiliate ID 35) are encrypted as illustrated in FIG. 3. Each vendor is assigned an encryption key which is stored in server computer system 21 (e.g., accessible to database subsystem 31). The vendor is also assigned a vendor ID 39 (FIG. 3) which is sent unencrypted in request 26. Computer system 21 in receipt of a request 26 uses the unencrypted vendor ID 39 in the request 26 to locate the key assigned to the respective vendor and to decrypt encrypted portion 37 of received request 26. In particular, computer system 21 utilizes the respective vendor encryption key to decode the encrypted portion 37 into the affiliate ID 35 and data request portion of received request 26.

Preferably, the invention API 22 uses the EncryptServer, a reusable component DLL on the Microsoft Windows platform, to encrypt the messages (requests 26 and responses 27) it sends and receives.

In the decrypted state the requests 26 received by the hyperlink database subsystem 31 are character strings containing: (i) the version number of the invention API 22; (ii) a time stamp, identifying the time and date when the request 26 was made; (iii) the user name and password of the affiliate; and (iv) information describing what data are requested.

In the preferred embodiment, the invention API 22 sends all data requests 26 to the hyperlink database subsystem 31 through the HTTP protocol using URLs as "data containers." The hyperlink database subsystem 31 parses the URL sent via HTTP, locates the vendor's encryption key (via the unencrypted vendor ID 39 discussed above), decrypts the data request string 37 (including affiliate ID 35), and performs the appropriate actions.

This is an example of the URL sent via HTTP by the invention API 22 in one embodiment:

http://www.reporting.net/networks/affiliates/
xml_gen?vendor=1111111?data=F D36SHJDSE853DJ The vendor parameter (in the example: "1111111") identifies the vendor partner so the encryption key can be located. The data parameter (in the example: "FD36SHJDSE853DJ") contains the encrypted data request string 37.

Further, in the preferred embodiment, the invention API 22 provides four types of data requests 26: merchant list request, section link group request, section link list request, and hyperlink data request.

With regard to "merchant list requests", the encrypted data request string 37 includes the following parameters:

"Version," identifying the invention API 22 version;

"Timestamp," identifying the time and date when the request was made;

"Username," identifying the affiliate's user name;

"Password," providing the affiliate's password; and

"Merchant List," identifying the type of data request 26.

When the data request string 37 of the merchant list request type is decoded, the hyperlink database subsystem 31 verifies the affiliate user name and a password and returns (in a response 27) a list of merchants for the affiliate. Preferably the return list of merchants is in the XML data format. This return list includes:

merchant name;

merchant ID;

merchant logo image URLs (thumbnail and banner graphics); and affiliate site ID.

With regard to the "section link group request" type, the encrypted data request string 37 includes the following parameters:

"Version," identifying the invention API 22 version;

"Timestamp," identifying the time and date when the request was made;

"Username," identifying the affiliate's user name;

"Password," providing the affiliate's password;

"Section Link Group List," identifying the type of data request 26;

"Merchant ID," identifying the affiliate-selected merchant; and

"Affiliate Site ID," identifying the affiliate site associated with the selected merchant.

When the data request string 37 of the section link group request type is decoded, the hyperlink database subsystem 31 verifies the affiliate user name and a password and returns (in response 27) a list of section link groups, preferably in the XML data format, for the given combination of Merchant ID and Affiliate Site ID. This return list includes:

section link group ID; and section link group name.

With regard to the "section link list request" type, the encrypted data request string 37 includes the following parameters:

"Version," identifying the invention API 22 version;

"Timestamp," identifying the time and date when the request was made;

"Username," identifying the affiliate's user name;

"Password," providing the affiliate's password;

"Section Link List," identifying the type of data request 26;

"Merchant ID," identifying the affiliate-selected merchant;

"Affiliate Site ID," identifying the affiliate site associated with the selected merchant; and "Section Link Group ID," identifying the affiliate-selected section link group.

When this type of data request string 37 is decoded, the hyperlink database subsystem 31 verifies the user name and a password and returns (in response 27) a list of hyperlinks, in the XML data format, for the given combination of Merchant ID, Affiliate Site ID, and Section Link Group ID. This return list includes:

the name of the specified section link group;

the list of links in the specified section link group;

link names;

link types (e.g. text, image) link image URL; and image dimensions.

If the Section Link Group ID parameter contains no data, the hyperlink database subsystem 31 returns all links for the given combination of Merchant ID and Affiliate Site ID.

With regard to the "hyperlink data request" type, the encrypted data request string 37 includes the following parameters:

"Version," identifying the invention API 22 version;
"Timestamp," identifying the time and date when the request was made;
"Username," identifying the affiliate's user name;
"Password," providing the affiliate's password;
"Hyperlink Data," identifying the type of data request 26;
"Merchant ID," identifying the affiliate-selected merchant;
"Affiliate Site ID," identifying the affiliate site associated with the selected merchant;
"Link ID," identifying the affiliate-selected link (e.g., link name); and
"Image ID," identifying the graphic image associated with the affiliate-selected link (e.g., link image URL).

When this type of data request string 37 is decoded, the hyperlink database subsystem 31 verifies the user name and a password, and returns in XML format (in response 27) the HTML code for the hyperlinks meeting the given combination of Merchant ID, Affiliate Site ID, Link ID, and Image ID. If Image ID contains no data, the hyperlink database subsystem 31 returns the HTML code for a hyperlink which is represented to the end user as text.

In the preferred embodiment, affiliates/users using the web development tool 24 employing the invention API 22 do not see the underlying code for the subject desired hyperlinks. They simply drag and drop a completed hyperlink from the vendor's web development tool's interface onto their web pages 23.

Figure 2:
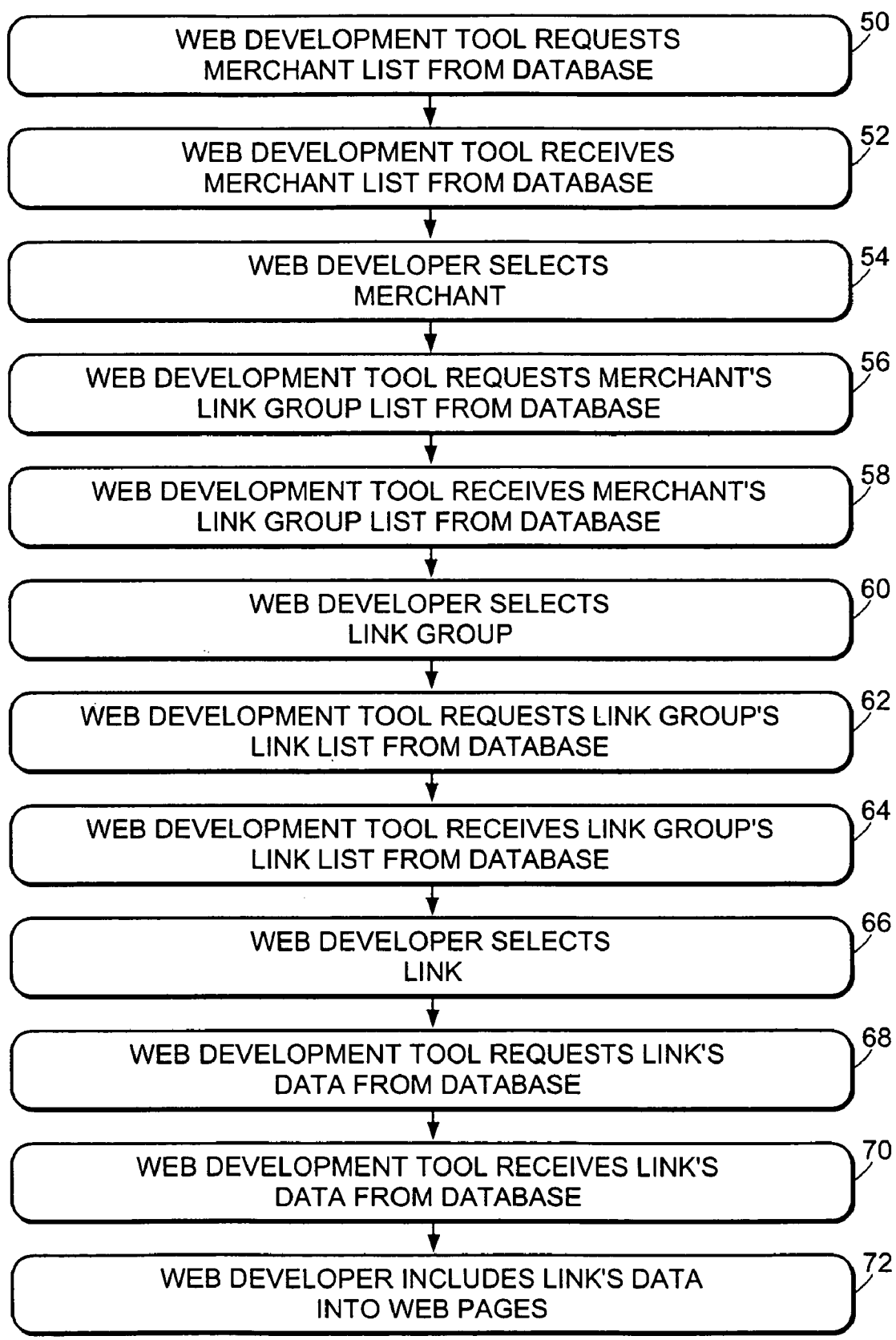
FIG. 2 is a flowchart of actions performed in the embodiment of FIG. 1.

Using the above-described data request types of the preferred embodiment, a typical sequence of data requests 26 and responses 27 combined with intermediate user actions is shown as a flowchart in FIG. 2. In step 50, the web development tool 24 invokes API invention 22 and generates a request 26 for a merchant list from hyperlink database 30. Following HTTP protocol, the API 22 transmits the generated request 26 to hyperlink database subsystem 31. In response, hyperlink database subsystem 31 processes the received merchant list request 26 and supplies a list of merchants based on the affiliate identified in the request 26. Hyperlink database subsystem 31 provides the merchant list in XML format in a response 27 which is communicated over network 28 following HTTP protocol to web development tool 24. In step 52 of FIG. 2, the web development tool 24 receives the merchant list from the database 30 and displays the same to the user (i.e., web developer).

In step 54, the web developer selects a merchant from the displayed merchant list. In response, the web development tool 24 employing API 22 generates a request for the merchant's link group list. That is, in step 56 the API 22 generates a request 26 of the "section link group request" type and transmits the request 26 to the hyperlink database subsystem 31. In response, hyperlink database subsystem 31 decodes the data request string 37 corresponding to the section link group request 26 and determines the affiliate selected merchant (from the merchant ID parameter) and the affiliate site associated with the selected merchant (from the affiliate site ID parameter). Based on the determined affiliate selected merchant and associated affiliate site, the hyperlink database subsystem 31 extracts the appropriate section link groups of the merchant from hyperlink database 30 and forms a return list of the merchant's section link groups.

Hyperlink database subsystem 31 transmits the return list in XML format in a response 27 via network 28 to the web development tool 24 (through API 22). As illustrated in step 58, the web development tool 24 receives the merchant's link group list as extracted from database 30 and displays the received list to the user (web developer).

Continuing with step 60 the web developer selects a link group from the displayed list of merchant's section link groups. In response to this selection, at step 62 web development tool 24 employs API 22 to generate a request 26 for the link list of the selected link group. In particular API 22 generates and transmits a request 26 of the "section link list request" type.

Upon receipt of this request 26, hyperlink database subsystem 31 determines the affiliate selected merchant (from the merchant ID parameter), the affiliate site associated with the select merchant (from the affiliate site ID parameter) and the affiliate selected section link group (from the section link group ID parameter) upon the decoding of the respective data request string 37 of the received request 26. Based on the determined affiliate-selected merchant, associated affiliate site and affiliate selected section link group, hyperlink database subsystem 31 extracts the names of pertinent hyperlinks from database 30. Hyperlink database subsystem 31 places the extracted hyperlink names in a return list in XML format and transmits the return list in a response 27 to API 22/web development tool 24.

With reference to step 64, the web development tool 24 receives the requested link list from response 27 returned by hyperlink database subsystem 31. In turn, web development tool 24 displays the received list of hyperlink names such that the web developer may select a desired link from the displayed list at step 66. With this selection, at step 68 the web development tool 24 employs API 22 and generates a "hyperlink data request" 26. API 22 transmits the generated hyperlink data request 26 to hyperlink database subsystem 31.

In response, hyperlink database subsystem 31 decodes the corresponding data request string 37 of the hyperlink data request 26 and determines the affiliate selected merchant, associated affiliate site, affiliate selected link name and optionally the affiliate selected link image URL. With this combination of parameter values, the hyperlink database subsystem 31 searches and retrieves from database 30 the desired hyperlink data. That is, hyperlink database subsystem 31 returns in an XML formatted response 27 the HTML code for the hyperlinks in database 30 meeting the combination of affiliate selected merchant, associated affiliate site, affiliate selected link name and link image URL from the request 26.

Web development tool 24, through API 22, receives the links data in response 27 at step 70. The web development tool 24 displays the received link data to the web developer. In step 72 the web developer uses a drag and drop interaction with the displayed links data to include the links data in the desired web page 23 under construction by the web developer. Where the responses 27 are in the XML data format, the web developer is able to interact with the displayed responses using a graphical user interface drag and drop operation to effect the embedding of the HTML code for the desired hyperlink into the subject web page 23 without the end user (web developer) actually seeing the underlying hyperlink code. Providing and placing desired hyperlinks in a subject web page 23 in this manner automates the process for developing hyperlinks in web pages and reduces error in the process as heretofore unachieved by the prior art.

While this invention has been particularly shown and described with references to preferred embodiments thereof, it will be understood by those skilled in the art that various changes in form and details may be made therein without departing from the scope of the invention encompassed by the appended claims.

For example, computer system 21 is depicted as a single server in FIG. 1 for simplicity and clarity in illustrating the present invention. It is understood that multiple computers or a network of computers may form computer system 21. Similarly, only one hyperlink database 30 is depicted in FIG. 1 but may physically be implemented by a plurality of data stores with the same overall functionality as described above.

Further it is understood that various other parameters may be employed in the data request string 37 in addition to or in place of those discussed above in the preferred embodiment. For example, the parameter Program Name or Program ID that indicates the network of the affiliate may be employed.

What is claimed is:

1. In a network of computers, a method of generating a hyperlink on a web page on a client computer, comprising the steps of:
   sending through the network a request having an input set of hyperlink parameters, the input set including indications of a merchant, an associated affiliate site and an affiliate-selected link; and
   in response to said request, receiving a response comprising:
   preformatted data necessary for generating at least one hyperlink, wherein said preformatted data necessary for generating said at least one hyperlink comprises computer usable or execution ready code necessary to execute each said hyperlink.

2. A method as claimed in claim 1, further comprising the step of selecting said input set of hyperlink parameters from a plurality of input sets of hyperlink parameters.

3. A method as claimed in claim 1, wherein said input set of hyperlink parameters includes a user name and a password.

4. A method as claimed in claim 1, wherein the response further includes an output set of hyperlink parameters, and at least one of said input set of hyperlink parameters and said output set of hyperlink parameters includes any combination of at least one of: Merchant identifier, Affiliate Site identifier, Section Link Group identifier, Link identifier, Image identifier, and Program identifier.

5. A method as claimed in claim 4, further comprising the step of combining said input set of hyperlink parameters and said output set of hyperlink parameters to form a second input set of hyperlink parameters in a subsequent request.

6. A method as claimed in claim 1, wherein said step of receiving includes receiving the response in Extensible Markup Language (XML) format.

7. A method as claimed in claim 1, wherein said code is conforming to the Hypertext Markup Language (HTML) standard.

8. A method as claimed in claim 1, wherein said computer usable or execution ready code includes a uniform resource locator (URL).

9. A method as claimed in claim 1, wherein said preformatted data necessary for generating said at least one hyperlink comprises, for each hyperlink, visual representation data describing at least one form of visual appearance of said hyperlink on a web page.

10. A method as claimed in claim 9, wherein said visual representation data includes a uniform resource locator (URL) for an image.

11. A method as claimed in claim 9, wherein said visual representation data includes indications of dimensions of an image.

12. A method as claimed in claim 1, wherein at least one of the steps of sending and receiving includes using the Hypertext Transfer Protocol (HTTP).

13. A method as claimed in claim 1, wherein said step of sending includes encrypting the request with a key identifiable by a key ID sent unencrypted together with said request.

14. A computer system for generating hyperlinks on a web page on a client computer, comprising:
    a client computer configured for communication in a network of computers; and
    a processor routine executing on said client computer, said processor routine:
    sending through the network a request having an input set of hyperlink parameters, the input set including indications of a merchant, an associated affiliate site and an affiliate-selected link; and
    in response to said request, receiving a response comprising:
    preformatted data necessary for generating at least one hyperlink, wherein said preformatted data necessary for generating said at least one hyperlink comprises computer usable or execution ready code necessary to execute each said hyperlink.

15. A computer system as claimed in claim 14, wherein said processor routine allows user selection of said input set of hyperlink parameters from among a plurality of input sets of hyperlink parameters.

16. A computer system as claimed in claim 14, wherein said input set of hyperlink parameters includes a user name and a password.

17. A computer system as claimed in claim 14, wherein the response further includes an output set of hyperlink parameters, and at least one of said input set of hyperlink parameters and said output set of hyperlink parameters includes any combination of at least one of: Merchant identifier, Affiliate Site identifier, Section Link Group identifier, Link identifier, Image identifier, and Program identifier.

18. A computer system as claimed in claim 17, wherein said processor routine allows combining said input set of hyperlink parameters and said output set of hyperlink parameters to form a second input set of hyperlink parameters in a subsequent request.

19. A computer system as claimed in claim 14, wherein said output set of hyperlink parameters is in Extensible Markup Language (XML) format.

20. A computer system as claimed in claim 14, wherein said code is conforming to the Hypertext Markup Language (HTML) standard.

21. A computer system as claimed in claim 14, wherein said computer usable or execution ready code includes a uniform resource locator (URL).

22. A computer system as claimed in claim 14, wherein said preformatted data necessary for generating said at least one hyperlink comprises, for each hyperlink, visual representation data describing at least one form of visual appearance of said hyperlink on a web page.

23. A computer system as claimed in claim 22, wherein said visual representation data includes a uniform resource locator (URL) for an image.

24. A computer system as claimed in claim 22, wherein said visual representation data includes indications of dimensions of an image.

25. A computer system as claimed in claim 14, wherein the processor routine utilizes the Hypertext Transfer Protocol (HTTP) in at least one of sending a request and receiving a response.

26. A computer system as claimed in claim 14, wherein said request is encrypted with a key identifiable by a key ID sent unencrypted together with said request.

27. A method of delivering hyperlink generation information from a server computer, comprising the steps of:
    receiving a request having an input set of hyperlink parameters, the input set including indications of a merchant, an associated affiliate site and an affiliate-selected link; and
    in response to said request, sending a response comprising:
        preformatted data necessary for generating at least one hyperlink, wherein said preformatted data necessary for generating said at least one hyperlink comprises computer usable or execution ready code necessary to execute each said hyperlink.

28. A method as claimed in claim 27, wherein at least one of said input set of hyperlink parameters includes a user name and a password.

29. A method as claimed in claim 27, wherein the response further includes an output set of hyperlink parameters, and at least one of said input set of hyperlink parameters and said output set of hyperlink parameters includes any combination of at least one of: Merchant ID, Affiliate Site ID, Section Link Group ID, Link ID, Image ID, and Program ID.

30. A method as claimed in claim 29, wherein said output set of hyperlink parameters is represented in the Extensible Markup Language (XML) format.

31. A method as claimed in claim 27, wherein said code is conforming to the Hypertext Markup Language (HTML) standard.

32. A method as claimed in claim 27, wherein said computer usable or execution ready code includes a uniform resource locator (URL).

33. A method as claimed in claim 27, wherein said preformatted data necessary for generating said at least one hyperlink comprises visual representation data describing at least one form of visual appearance of said at least one hyperlink on a web page.

34. A method as claimed in claim 33, wherein said visual representation data includes a uniform resource locator (URL) for an image.

35. A method as claimed in claim 33, wherein said visual representation data includes indications of dimensions of an image.

36. A method as claimed in claim 27, wherein at least one of said steps of receiving and sending includes using the Hypertext Transfer Protocol (HTTP).

37. A method as claimed in claim 27, wherein said request is encrypted with a key identifiable by a key ID; and
    said step of receiving includes receiving the key ID unencrypted together with said request.

38. A system for delivering hyperlink information from a server computer, comprising:
    a server computer; and
    a server process executing on said server computer for:
        receiving a request containing an input set of hyperlink parameters, the input set including indications of a merchant, an associated affiliate site and an affiliate-selected link; and
        in response to said request, sending a response comprising:
            preformatted data necessary for generating at least one hyperlink, wherein said preformatted data necessary for generating said at least one hyperlink comprises computer usable or execution ready code necessary to execute each said hyperlink.

39. A system as claimed in claim 38, wherein said input set of hyperlink parameters includes a user name and a password.

40. A system as claimed in claim 38, wherein the response further includes an output set of hyperlink parameters, and at least one of said input set of hyperlink parameters and said output set of hyperlink parameters includes any combination of at least one of: Merchant ID, Affiliate Site ID, Section Link Group ID, Link ID, Image ID, and Program ID.

41. A system as claimed in claim 40, wherein said output set of hyperlink parameters is represented in the Extensible Markup Language (XML) format.

42. A system as claimed in claim 37, wherein said code is conforming to the Hypertext Markup Language (HTML) standard.

43. A system as claimed in claim 38, wherein said computer usable or execution ready code includes a uniform resource locator (URL).

44. A system as claimed in claim 38, wherein said preformatted data necessary for generating said at least one hyperlink comprises visual representation data describing at least one form of visual appearance of said hyperlink on a web page.

45. A system as claimed in claim 44, wherein said visual representation data includes a uniform resource locator (URL) for an image.

46. A system as claimed in claim 44, wherein said visual representation data includes indications of dimensions of an image.

47. A system as claimed in claim 38, wherein the server process uses Hypertext Transfer Protocol (HTTP) for at least one or receiving a request and sending a response.

48. A system as claimed in claim 38, wherein said request is encrypted with a key identifiable by a key ID received unencrypted together with said request.

49. In a network of computers, a method of generating a hyperlink on a desired Web page, comprising the steps of:
    sending through the network a request having an input set of hyperlink parameters, the input set including any combination of indications of a hyperlink data request, a user, a merchant, an affiliate site associated with the merchant and an affiliate-selected link; and
    in response to said request, generating a response comprising:
        an output set of hyperlink parameters, the output set including any of a merchant identifier, an affiliate site identifier and link names; and
        preformatted data necessary for generating at least one hyperlink, wherein said preformatted data necessary for generating said at least one hyperlink comprises computer usable or execution ready code necessary to execute each said hyperlink.

* * * * *